(12) United States Patent
Ichimura et al.

(10) Patent No.: US 8,085,402 B2
(45) Date of Patent: Dec. 27, 2011

(54) MICROSCOPE AND AN OBSERVATION METHOD IN THE MICROSCOPE

(75) Inventors: Kouichi Ichimura, Kanagawa-ken (JP); Hayato Goto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 77 days.

(21) Appl. No.: 12/696,374

(22) Filed: Jan. 29, 2010

(65) Prior Publication Data

US 2010/0195104 A1    Aug. 5, 2010

(30) Foreign Application Priority Data

Jan. 30, 2009    (JP) ................. 2009-020280

(51) Int. Cl.
*G01N 21/00*    (2006.01)
(52) U.S. Cl. ........................................ 356/432; 356/440
(58) Field of Classification Search .......... 356/432–438, 356/450–521; 250/200, 216; 257/31, 30, 257/9; 712/1
See application file for complete search history.

(56) References Cited

U.S. PATENT DOCUMENTS

2008/0231837 A1    9/2008    Ichimura et al.

OTHER PUBLICATIONS

"Mechanism and Application of Optical device", Optronics.co.jp, 2003. (p. 70-73).

*Primary Examiner* — Gregory J Toatley
*Assistant Examiner* — Tri T Ton
(74) *Attorney, Agent, or Firm* — Oblon, Spivak, McClelland, Maier & Neustadt, L.L.P.

(57) ABSTRACT

In a cavity mode of a cavity, a diameter of a mode waist is decreased so that the diameter is similar to a wavelength of an electromagnetic wave resonant with the cavity mode, when a material is located in the cavity. The material includes a physical system having two quantum states. A relative position between the material and the mode waist is scanned along three-directions unparallel mutually. A laser coupled with the cavity mode is input to the cavity. An intensity of at least one of a reflected light and a transmitted light of the laser from the cavity is measured.

7 Claims, 4 Drawing Sheets $\omega_c$ : RESONANCE FREQUENCY OF CAVITY MODE IN CASE THAT THE PHYSICAL SYSTEM DOES NOT EXIST AT A POSITION OF THE MODE WAIST

MICROSCOPE AND AN OBSERVATION METHOD IN THE MICROSCOPE

CROSS-REFERENCE TO RELATED APPLICATIONS

This application is based upon and claims the benefit of priority from Japanese Patent Application No. 2009-020280, filed on Jan. 30, 2009; the entire contents of which are incorporated herein by reference.

FIELD OF THE INVENTION

The present invention relates to a microscope and a method for observing a position of a single physical system in a material.

BACKGROUND OF THE INVENTION

As to a single physical system (such as an atom, a molecule, or an ion) three-dimensionally distributed in a material, a cofocal laser microscope is well-known as an apparatus for observing a position or a state of the single physical system. For example, the cofocal laser microscope is described in "Mechanism and Application of Optical device", p 70-73, published by Optronics.co.jp, 2003. In this microscope, a laser is converged by a first lens, a fluorescence radiated from some material positioned at a focus is converted to a parallel-light by the first lens, and the parallel-light is converged by a second lens. By locating a pin-hole at a focus of the second lens, the fluorescence is detected behind the pin-hole. As a result, from the focus (converged by the first lens) having a size three-dimensionally similar to the wavelength, the fluorescence is only detected. Accordingly, by scanning a focal position (converged by the first lens), a position of a fluorescent material in the material can be three-dimensionally examined.

However, in this method, following two defects are included.

(1) This microscope is only applied to a physical system radiating a strong fluorescence.

(2) In case of a single quantum system, this microscope is only applied to an object quickly repeating an excitation and a relaxation (radiating the fluorescence) with the same laser wavelength.

For example, this microscope cannot be applied to a molecule changing with an optical excitation, or a molecule, an atom and an ion each of which population moves to a state different from an initial state.

In the material, as to a physical system having a weak fluorescence (or not radiating the fluorescence), or a single physical system (such as a rare earth ion in a crystal) generating only one photon at a first excitation (by changing after the first excitation or by moving the population), a position and a state cannot be three-dimensionally observed. Briefly, an apparatus and a method for observing the position and the state with high sensitivity and high spatial resolution (similar to the wavelength) are not known yet.

SUMMARY OF THE INVENTION

The present invention is directed to a microscope and a method for observing a position of the single physical position three-dimensionally distributed in the material with high resolution and high sensitivity.

According to an aspect of the present invention, there is provided a microscope comprising: a cavity having a cavity mode of which a diameter of a mode waist is decreased so that the diameter is similar to a wavelength of an electromagnetic wave resonant with the cavity mode when a material is located in the cavity, the material including a physical system having two quantum states; a scanning unit configured to scan a relative position between the material and the mode waist along three-directions unparallel mutually; a generation unit configured to generate a laser coupled with the cavity mode, the laser being input to the cavity; and a measurement unit configured to measure an intensity of at least one of a reflected light and a transmitted light of the laser from the cavity.

DETAILED DESCRIPTION OF THE EMBODIMENTS

Figure 1A:
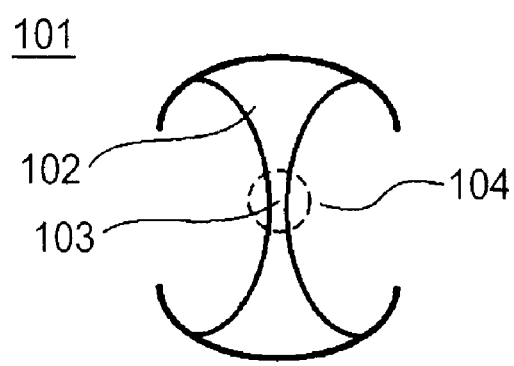
FIGS. 1A and 1B are schematic diagrams of a cavity mode having a mode waist similar to the wavelength.

Hereinafter, embodiments of the present invention will be explained by referring to the drawings. The present invention is not limited to the following embodiments.

Figure 1B:
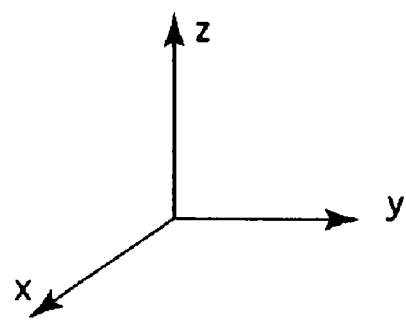

As to a microscope of one embodiment, mechanism of the operation is explained by referring to FIGS. 1B and 1B. As to the one embodiment, an optical cavity 101 having a mode waist 103 of which a diameter is similar to a wavelength of an incident electromagnetic wave is used. The wavelength of the electromagnetic wave is set to resonant with a cavity mode of the optical cavity 103 (including a material). In this case, a mode wave front of the mode waist is narrowed along x-y directions in FIG. 1A. In a cavity mode 102 having the mode waist narrowed, when a position is apart from the mode waist 103 along a direction (z-direction in FIG. 1B) perpendicular to the wave front, a width of the mode becomes suddenly wide, and a coupling constant between a physical system and a cavity mode becomes suddenly small. Accordingly, only the physical system located at a region 104 of the wavelength centering the mode waist 103 is strongly coupled with the cavity mode 102. Briefly, a diameter of the mode waist 103 is narrowed so that the diameter is equal to the wavelength of the electromagnetic wave (resonant with the cavity mode of the optical cavity 101) in effective resolution. The physical system is, for example, the atom, the molecule, or the ion 205 distributed in the material.

In the present embodiment, as explained afterwards, by detecting a coupling strength with the cavity mode, a position and a state of a physical system (hereinafter, it is called two state system) having two quantum states are observed. Accordingly, by decreasing the cavity mode to a wavelength, the microscope of the present embodiment can have three-dimensionally a spatial resolution similar to the wavelength.

With regard to the same cavity length, if a diameter of the mode waist is sufficiently longer than the wavelength, when the diameter is more decreased, a coupling constant becomes larger. If the diameter is decreased to be similar to the wavelength and the cavity mode extends toward both sides of the mode waist, when the diameter is more decreased, a coupling constant becomes also larger. Accordingly, decrease of the mode waist to the wavelength contributes to increase of the coupling constant and increase of an observation signal as a result.

Briefly, if the mode waist is decreased to the wavelength, when a size of the mode waist is smaller, the coupling constant more increases. Hereinafter, this theory is proved.

By determining a shape of the optical cavity 101, a frequency of an electromagnetic field existing in the optical cavity 101, and a spatial distribution (cavity mode) of an amplitude corresponding to the frequency are determined as a description (1).

$$\psi(\vec{r}) \tag{1}$$

The description (1) is normalized so that the maximum is "1". A physical system included in the cavity couples with the cavity mode with a coupling constant of an equation (2).

$$g(\vec{r}) = g_0 \psi(\vec{r}) \tag{2}$$

In the equation (2), $g_0$ as a maximum of the coupling constant between the cavity mode and the physical system is represented as an equation (3).

$$g_0 = \mu \sqrt{\frac{\omega_a}{2\hbar\varepsilon_0 V}} \times ct(n_{ri}) \tag{3}$$

Below mentioned (4) respectively represents a transition dipole moment of the physical system, a transition angle frequency of the physical system a Dirac's constant, a dielectric constant of vacuum, a refractive index ("1" in vacuum) of a dielectric filling the cavity, and a mode volume. Furthermore, $ct(n_{ri})$ is a correction depending on the refractive index of the dielectric filling the cavity. The mode volume is represented as an equation (5).

$$\mu, \omega_a, \hbar, \varepsilon_0, n_{ri}, V \tag{4}$$

$$V = \int |\psi(\vec{r})|^2 d^3\vec{r} \tag{5}$$

As to a Fabry-Perot type cavity 101 having two spherical mirrors facing each other, a cavity mode has a shape of a circular hyperboloid having a rotation axis as a line (z-axis) connecting each center of the two spherical mirrors composing the cavity 101, and is represented by superposition of two Gaussian beams of traveling-wave type which move forward mutually in reverse along the rotation axis and of which move directions are only different (the wave number, and the position where a radius of the beam is the smallest, are same in the two Gaussian beams).

The Gaussian beam of traveling-wave type is specified by a position (of a beam waist) where a radius of the beam is the smallest, the radius (of the beam waist) and the wave number (having direction). As to the Gaussian beam of traveling-wave type having a radius $\omega_0$ of beam waist at z=0, with a center moving along z-axis and the wave number k, an electric field for a vertical transverse mode (p,q) is represented as an equation (6).

$$E_{l,m}(x,y,z) = E_0 \frac{\omega_0}{\omega(z)} H_p\left(\sqrt{2}\frac{x}{\omega(z)}\right) H_q\left(\sqrt{2}\frac{y}{\omega(z)}\right) \times \exp\left(-\frac{x^2+y^2}{\omega^2(z)} - ik\frac{x^2+y^2}{2R(z)} - ikz + i(p+q+1)\eta\right) \tag{6}$$

In the equation (6), k, $\omega(z)$, $z_0$, $R(z)$ and $\eta$ are respectively represented as (7)~(11).

$$k = \frac{2\pi}{\lambda} \tag{7}$$

$$\omega(z) = \omega_0 \left\{ 1 + \left(\frac{z}{z_0}\right)^2 \right\}^{\frac{1}{2}} \tag{8}$$

$$z_0 = \frac{\pi \omega_0^2 n_{ri}}{\lambda} \tag{9}$$

$$R(z) = z \left\{ 1 + \left(\frac{\pi \omega_0^2 n_{ri}}{\lambda z}\right) \right\} = \frac{1}{z}(z^2 + z_0^2) \tag{10}$$

$$\eta = \tan^{-1}\left(\frac{\lambda z}{\pi \omega_0^2 n_{ri}}\right) \tag{11}$$

In this case, Hp is Hermite polynomial expression having p-order, and $\lambda$ is a wavelength of the cavity mode. In the equation (10), R(z) is a radius of curvature of a wave front at z.

In the cavity 101, by considering a leakage of the electromagnetic field (represented as the equation (6)) from an edge of the spherical mirror (composing the cavity), a cavity mode composed by a Gaussian beam of a lowest order (p=q=0), which has the longest life time and the highest Q value, is thought about.

In the cavity, by reflection from the mirror, waves +k and −k form a standing wave $E_\pm(x,y,z)$. From the equation (6) and "$H_0=1$", the standing wave is represented as an equation (12).

$$E_\pm(x,y,z) = E_0 \frac{\omega_0}{\omega(z)} \exp\left(-\frac{x^2+y^2}{\omega^2(z)} - ik\frac{x^2+y^2}{2R(z)} - ikz + i\eta\right) + \tag{12}$$

$$E_0 \frac{\omega_0}{\omega(z)} \exp\left(-\frac{x^2+y^2}{\omega^2(z)} + ik\frac{x^2+y^2}{2R(z)} + ikz + i\eta\right)$$

$$= 2E_0 \frac{\omega_0}{\omega(z)} \exp\left(-\frac{x^2+y^2}{\omega^2(z)} + i\eta\right) \cos\left\{k\left(\frac{x^2+y^2}{2R(z)} + z\right)\right\}$$

The maximum of the electric field is "$|E_\pm(x,y,z)|=2E_0 \omega_0 |e^{i\eta}|/\omega(0)=2E_0$". The normalized cavity mode is represented as an equation (13).

$$\psi(\vec{r}) = \frac{\omega_0}{\omega(z)} \exp\left(-\frac{x^2+y^2}{\omega^2(z)} + i\eta\right) \cos\left\{k\left(\frac{x^2+y^2}{2R(z)} + z\right)\right\} \tag{13}$$

Accordingly, a mode volume of the cavity mode is represented as an equation (14).

$$V = \int |\psi(\vec{r})|^2 d^3 r \tag{14}$$

$$= \int \left| \frac{\omega_0}{\omega(z)} \exp\left(-\frac{x^2+y^2}{\omega^2(z)} + i\eta\right) \cos\left\{k\left(\frac{x^2+y^2}{2R(z)} + z\right)\right\} \right|^2 dxdydz$$

$$= 2 \int_0^{\frac{1}{2}} \int_0^{2\pi} \int_0^{a(z)} \left(\frac{\omega_0}{\omega(z)}\right)^2 \exp\left(-\frac{2r^2}{\omega^2(z)}\right) \cos^2\left\{k\left(\frac{r^2}{2R(z)} + z\right)\right\} r dr d\phi dz$$

-continued $$= 4\pi \int_0^{\frac{l}{2}} \int_0^{\alpha(z)} \left(\frac{\omega_0}{\omega(z)}\right)^2 \exp\left(-\frac{2r^2}{\omega^2(z)}\right)$$
$$\cos^2\left\{k\left(\frac{r^2}{2R(z)} + z\right)\right\} r\, dr\, dz$$

In the equation (14), $\alpha(z)$ is a distance between z-axis and the spherical mirror at a coordinate z, which is represented as an equation (15).

$$\alpha(z) = \sqrt{R_m^2 - \left\{z + \left(R_m - \frac{l}{2}\right)\right\}^2} \tag{15}$$
$$= \sqrt{-z^2 - 2zR_m + zl + R_m - \frac{l^2}{4}}$$

A position of two spherical mirrors is $z=-\frac{1}{2}l$ and $z=\frac{1}{2}l$, and a radius of curvature of two spherical mirrors is $-R_m$ and $R_m$. In latter case, if a center is positioned at the right side of the spherical surface, the radius of curvature is a negative value. If a center is positioned at the left side of the spherical surface, the radius of curvature is a positive value. $-R_m$ and $R_m$ respectively match the radius of curvature of a wave front (represented by the equation (10)) at $z=-\frac{1}{2}l$ and $z=\frac{1}{2}l$.

In this case, even if the cavity mode of lowest order composed by a Gaussian mode (p=q=0) extends larger than the wavelength on a spherical mirror, the cavity mode sufficiently concentrates around z-axis in comparison with a radius of curvature of the spherical mirror. Accordingly, by replacing an integral range "$0\sim\alpha(z)$" with the integral range "$0\sim\infty$", a following equation (16) is concluded.

$$V = 4\pi \int_0^{\frac{l}{2}} \int_0^{\infty} \left(\frac{\omega_0}{\omega(z)}\right)^2 \exp\left(-\frac{2r^2}{\omega^2(z)}\right) \tag{16}$$
$$\cos^2\left\{k\left(\frac{r^2}{2R(z)} + z\right)\right\} r\, dr\, dz$$
$$= 2\pi \int_0^{\frac{l}{2}} \int_0^{\infty} \left(\frac{\omega_0}{\omega(z)}\right)^2 \exp\left(-\frac{2t}{\omega^2(z)}\right) \cos^2\left\{k\left(\frac{t}{2R(z)} + z\right)\right\} dt\, dz$$
$$= \pi \int_0^{\frac{l}{2}} \int_0^{\infty} \left(\frac{\omega_0}{\omega(z)}\right)^2 \exp\left(-\frac{2t}{\omega^2(z)}\right) \cos\left\{k\left(\frac{t}{R(z)} + 2z\right)\right\} dt\, dz +$$
$$\pi \int_0^{\frac{l}{2}} \int_0^{\infty} \left(\frac{\omega_0}{\omega(z)}\right)^2 \exp\left(-\frac{2t}{\omega^2(z)}\right) dt\, dz$$
$$= \pi \int_0^{\frac{l}{2}} \int_0^{\infty} \left(\frac{\omega_0}{\omega(z)}\right)^2 \cos 2kz \exp\left(-\frac{2t}{\omega^2(z)}\right) \cos\frac{kt}{R(z)} dt\, dz -$$
$$\pi \int_0^{\frac{l}{2}} \int_0^{\infty} \left(\frac{\omega_0}{\omega(z)}\right)^2 \sin 2kz \exp\left(-\frac{2t}{\omega^2(z)}\right) \sin\frac{kt}{R(z)} dt\, dz +$$
$$\pi \int_0^{\frac{l}{2}} \left(\frac{\omega_0}{\omega(z)}\right)^2 \frac{\omega^2(z)}{2} dz$$
$$= \pi \int_0^{\frac{l}{2}} \cos 2kz \frac{\frac{2\omega_0^2}{\omega^4(z)}}{\frac{4}{\omega^4(z)} + \frac{k^2}{R^2(z)}} dz -$$
$$\pi \int_0^{\frac{l}{2}} \sin 2kz \frac{\frac{\omega_0^2 k}{\omega^2(z)R(z)}}{\frac{4}{\omega^4(z)} + \frac{k^2}{R^2(z)}} dz + \frac{1}{4}\pi\omega_0^2 l$$

By using an equation (17), the equation (16) is represented as an equation (18).

$$u(z) = \frac{\frac{2\omega_0^2}{\omega^4(z)}}{\frac{4}{\omega^4(z)} + \frac{k^2}{R^2(z)}}, \quad v(z) = \frac{\frac{\omega_0^2 k}{\omega^2(z)R(z)}}{\frac{4}{\omega^4(z)} + \frac{k^2}{R^2(z)}} \tag{17}$$

$$V = \pi \int_0^{\frac{l}{2}} \cos 2kz \cdot u(z)\, dz - \pi \int_0^{\frac{l}{2}} \sin 2kz \cdot v(z)\, dz + \frac{1}{4}\pi\omega_0^2 l \tag{18}$$

If u(z) and v(z) are respectively a function to slowly change for cos 2kz and sin 2kz, a first term and a second term of the equation (18) are respectively zero, and the mode volume is approximated as an equation (19).

$$V = \frac{1}{4}\pi\omega_0^2 l \tag{19}$$

By equations (7)~(10), first, the cavity mode is a columnar shape which a radius $\omega_o$ of mode waist is sufficiently larger than $\lambda$. While the radius $\omega_o$ is near $\lambda$, the cavity mode is transformed to a hourglass shape by extending larger than the wavelength but remaining within a region sufficiently narrower than the mirror surface (a leakage from an edge of the mirror face is ignored). Briefly, as to the radius $\omega_o$ changing from the columnar shape to the sandglass shape, u(z) and v(z) are regarded as a function to slowly change for cos 2kz and sin 2kz, and the mode volume is represented as the equation (19).

In this case, a mathematical range to strictly conclude the approximate equation (19) is not calculated. Even if this approximate equation is not concluded, by using the equation (16), an upper limit of the mode volume is represented as an equation (20).

$$V = 2\pi \int_0^{\frac{l}{2}} \int_0^{\infty} \left(\frac{\omega_0}{\omega(z)}\right)^2 \exp\left(-\frac{2t}{\omega^2(z)}\right) \tag{20}$$
$$\cos^2\left\{k\left(\frac{t}{2R(z)} + z\right)\right\} dt\, dz <$$
$$2\pi \int_0^{\frac{l}{2}} \int_0^{\infty} \left(\frac{\omega_0}{\omega(z)}\right)^2 \exp\left(-\frac{2t}{\omega^2(z)}\right) dt\, dz$$
$$= \frac{1}{2}\pi\omega_0^2 l$$

Accordingly, the mode volume represented as the equation (18) is not larger than twice as large as approximated value of the equation (19).

From above-consideration, even if the radius $\omega_o$ is near $\lambda$ and the cavity mode extends larger than the wavelength on the mirror surface, when the extended region is sufficiently narrower that the mirror surface, the mode volume can be well approximated by the equation (19).

The maximum of the coupling constant is acquired at a center of the mode waist. By using the equations (3) and (19), the maximum is represented as an equation (19), which is in inverse proportion to a radius $\omega_o$ of the mode waist.

$$g_0 = \frac{\mu}{\omega_0}\sqrt{\frac{2\omega_a}{\hbar\varepsilon_0\pi l}} \times ct(n_{ri}) \qquad (21)$$

As mentioned-above, even if both sides of the cavity mode expand by decreasing a radius of the mode waist to the wavelength, a coupling constant between the cavity mode and a physical system (located at the mode waist) is in inverse proportion to the radius of the mode waist.

Figure 2:
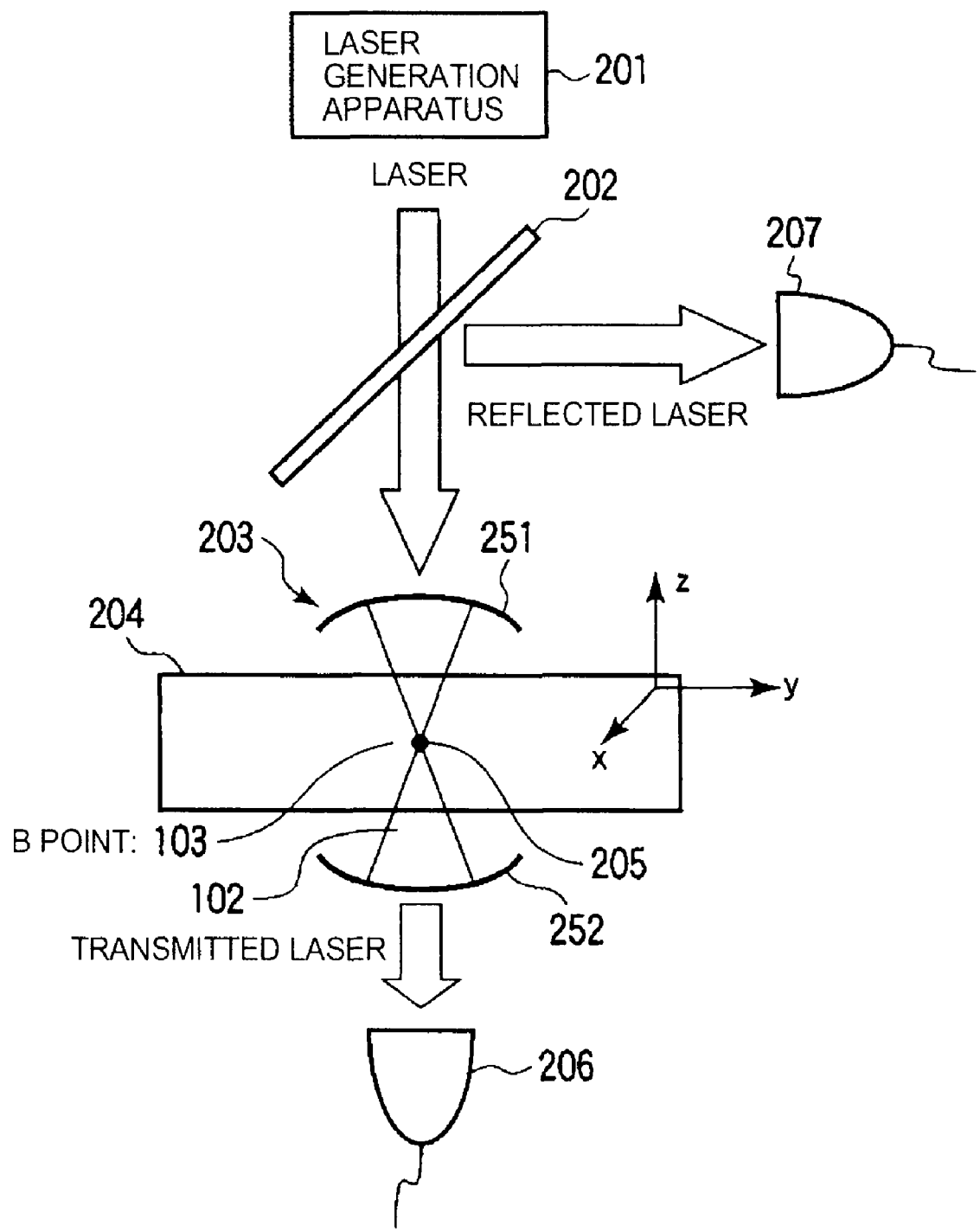
FIG. 2 is a schematic diagram showing mechanism of a microscope utilizing a vacuum Rabi spectrum according to one embodiment.

In the present embodiment, by three-dimensionally scanning such mode waist (B point in FIG. 2) in a material 204, a laser spatially coupled with a cavity mode (uncoupled with a physical system) is generated from outside of an optical cavity, and a reflected light and/or a transmitted light of the laser from the cavity is observed. As to three-dimensional scanning, a scanning apparatus scans a relative position between the material and the mode waist along three-directions mutually unparallel. The scanning apparatus 403 is, for example, a stage for driving with Piezoelectric element 402. This stage can move the material along x-axis, y-axis and z-axis mutually perpendicular, on which the material is fixed.

In case that two state system (resonant with the cavity mode) is not located at B point, a laser generated from a laser generation apparatus 201 transmits via an optical cavity 203, 251, 252 because the laser is coupled with the cavity mode. On the other hand, in comparison with a case that the physical system is located at B point, an intensity of a reflected light of the laser from the optical cavity 203 is smaller.

Figure 3A:
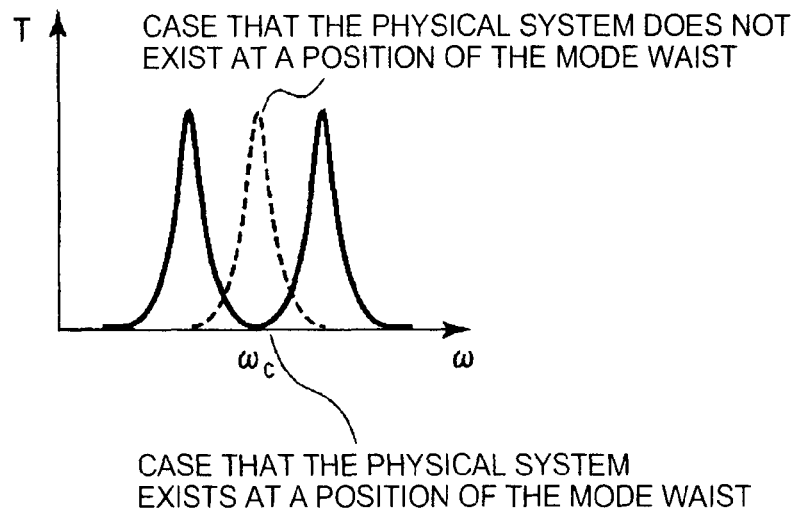
FIGS. 3A and 3B are graphs showing intensities of a transmitted laser and a reflected laser from the cavity by coupling the cavity mode with a physical system.
Figure 3B:
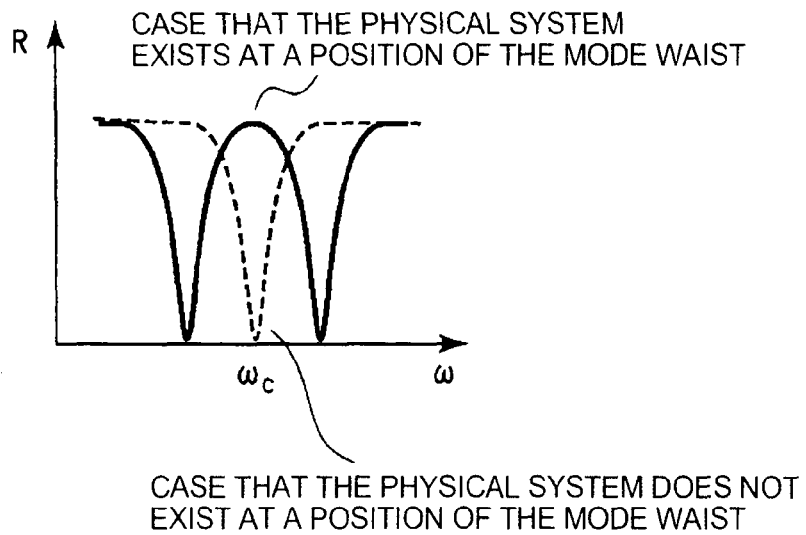

In case that two state system (resonant with the cavity mode) is located at B point, by a vacuum Rabi spectrum with coupling between the two state system and the cavity mode, a resonance frequency generated from coupling between the two state system and the cavity mode is divided into two frequencies and respectively moved. As a result, the laser cannot transmit the optical cavity 203 as shown in FIG. 3A. On the other hand, the intensity of a reflected light of the laser from the optical cavity 203 increases as shown in FIG. 3B. A detector 206 detects a transmitted light of the laser, and measures an intensity of the transmitted light. A detector 207 detects a reflected light of the laser, and measures an intensity of the reflected light.

In case of observing using such vacuum Rabi spectrum, a physical system (as an observation object) need not radiate a fluorescence. Furthermore, in case of observing a single physical system using the fluorescence, even if an intensity of the laser is strengthened, one photon (used for observation) is only generated in a period of life time of upper state of the two state system. However, in case of using the vacuum Rabi spectrum, a large number of photons depending on the intensity of the laser (irradiated) is generated in the same period, and a large signal by the large number of photons can be acquired.

Furthermore, in the two state system, change (dissociation or isomerisation) by an excitation, or disappearance of absorption by a population moving, are often occurred. In this case, even if the laser is continually irradiated, the single physical system emits at largest one photon as a fluorescence, and observation using the fluorescence is actually impossible. However, in case of using the vacuum Rabi spectrum, before change by the excitation or the population moving occurs in the period of life time of the upper state, the physical system can be sensitively detected using a large number of photons.

As mentioned-above, in the material, as to a physical system radiating (or not radiating) a weak fluorescence or a single physical system generating one photon by change of one excitation or population moving, a position and a state can be sensitively three-dimensionally measured with spatial resolution similar to the wavelength. Hereinafter, embodiments of the present invention are explained.

The First Embodiment

As to the microscope of the present embodiment, an optical cavity of Fabry-Perot type having a cavity length "1 mm" variable by a Piezoelectric element is used. On condition that an observation object is included in the cavity, a cavity mode is adjusted to resonant with 494.68×2 $\pi$THz (approximately 606.035 nm). Furthermore, a mirror having high reflection ratio is put on a polished glass of the cavity. A resonance frequency of the cavity is variable because the cavity length is variable.

As to this cavity mode, a laser having a spectrum width reduced to 1 kHz is coupled spatially and in frequency. A transmitted laser from the cavity is detected by a first photo diode, and an intensity of the transmitted laser is measured. A reflected laser from the cavity is further reflected by a partially reflecting dielectric multilayer mirror 202, a reflected laser from the mirror is detected by a second photo diode, and an intensity of the reflected laser is measured.

As a material of the observation object, $Pr^{3+}$:$Y_2S_iO_5$ crystal in which "$10^{-5}$%" $Y^{3+}$ion of $Y_2S_iO_5$ is replaced with $Pr^{3+}$ ion. A size of the crystal is 10 mm×20 mm×1 mm, two faces having 10 mm×20 mm are mirror-polished, and a dielectric multilayer film to prevent reflection at laser frequency is put on the crystal. Furthermore, this crystal is fixed on a driving stage by Piezoelectric element to move along x-axis, y-axis and z-axis mutually perpendicular.

Figure 4:
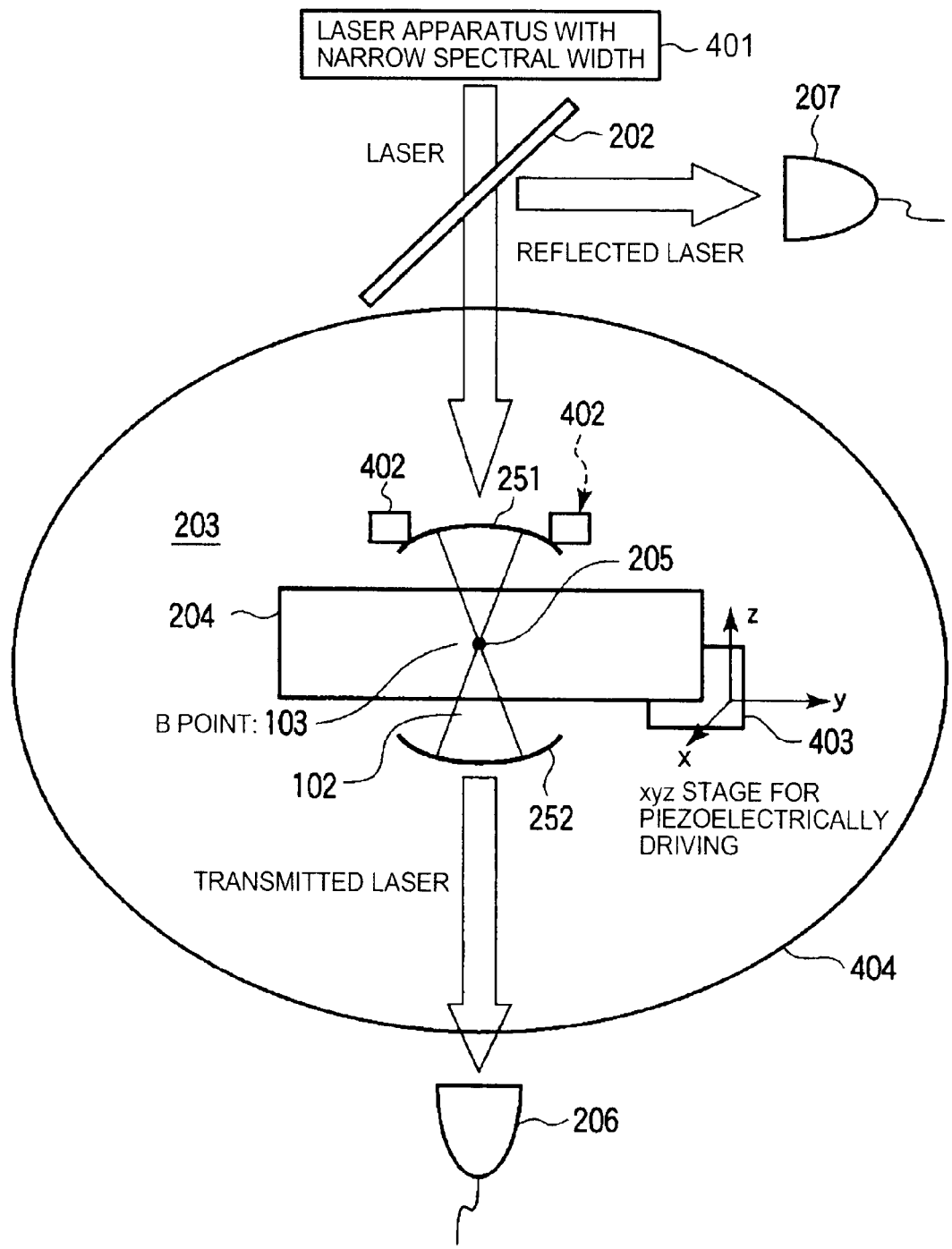
FIG. 4 is a block diagram of the microscope utilizing the microscope according to the one embodiment.

The optical cavity having the Piezoelectric element, the crystal as the observation object, and the stage by Piezoelectric element, are located in a cryostat 404, and a temperature inside the cryostat is maintained as 4K. Above-mentioned status is shown in FIG. 4.

In this apparatus, by arbitrarily measuring an intensity of the transmitted laser and the reflected laser, the Piezoelectric-driving stage is moved along x-axis, y-axis and z-axis. In this case, scanning speed is approximately set to 0.05 μm/s so that a period which the mode waist crosses a single $Pr^{3+}$ion is approximately shorter than 200μ second (life time of upper state in two quantum states of $Pr^{3+}$ion).

Furthermore, the mode waist is fixed at a first point, and the laser is coupled with the cavity mode in a period of 20μ second. Next, the mode waist is moved to a second point depart from the first point as 1 μm, and the laser is coupled with the cavity mode in a period of 20μ second. By repeating this processing, an intensity of the transmitted laser and the reflected laser from the cavity is measured at each point. Alternatively, by weakening the laser light, a scanning speed may be set slower than 0.05 μm/s.

As mentioned-above, by measuring an intensity of the transmitted laser and the reflected laser from the cavity, the mode waist is three-dimensionally moved. At some point, the intensity of the transmitted laser largely decreases, and the intensity of the reflected laser largely increases. Furthermore, by moving the stage from this point as 2μ along x-axis, y-axis and z-axis, the intensity of the transmitted laser largely increases, and the intensity of the reflected laser largely decreases. In this case, at the point where the intensity of the transmitted laser largely decreases and the intensity of the reflected laser largely increases, $Pr^{3+}$ion is decided to exist.

In this way, as to single $Pr^{3+}$ion in $Y_2S_iO_5$ crystal, which transits to another metastable state (one state in hyperfine structure of electronic ground state) after one excitation and does not absorb the light, a position in the material can be specified with a spatial resolution similar to the wavelength.

The Second Embodiment

At a position where $Pr^{3+}$ion exists (detected as explained in the first embodiment), a laser frequency is swept as 1 MHz. In many cases, the transmitted laser shows two peaks having a distance 120 kHz, and the reflected laser shows two dips having a distance 120 kHz. This fact is a confirmation that a single ion is detected. If two peaks have $2^{1/2}$ times as long as the distance 120 kHz, or if two dips have $2^{1/2}$ times as long as the distance 120 kHz, it happens that two $Pr^{3+}$ions exist within a range similar to the wavelength from a position of the mode waist. In this way, by sweeping the laser frequency at each measurement point, information quantity acquirable can be increased, and precision of the measurement can be raised.

According to above-mentioned embodiment, a physical quantity to be detected is a coupling intensity between the physical system (observation object) and the cavity mode. As to the observation method, change of a reflected laser or a transmitted laser (coupled with the cavity mode) by vacuum Rabi spectrum is observed. Accordingly, as to a single physical system (atom, molecule, ion, and so on) three-dimensionally distributed in the material, a position and a quantum state can be observed. Briefly, the microscope able to extend a range of the observation object and raise sensitivity of the observation is provided.

This observation method can be applied to a physical system radiating a weak fluorescence (or not radiating the fluorescence). Furthermore, this observation method can be applied to a physical system which changes by the optical excitation (dissociation, isomerisation) or does not absorb the light by population moving. Briefly, the microscope having the spatial resolution similar to the wavelength, which sufficiently acquires the signal intensity by a large number of photons with a high sensitivity, is provided.

Other embodiments of the invention will be apparent to those skilled in the art from consideration of the specification and embodiments of the invention disclosed herein. It is intended that the specification and embodiments be considered as exemplary only, with the scope and spirit of the invention being indicated by the claims.

What is claimed is:

1. A microscope comprising:
a cavity having a cavity mode of which a diameter of a mode waist is decreased so that the diameter is similar to a wavelength of an electromagnetic wave resonant with the cavity mode when a material is located in the cavity, the material including a physical system having two quantum states;
a scanning unit configured to scan a relative position between the material and the mode waist along three-directions unparallel mutually;
a generation unit configured to generate a laser coupled with the cavity mode, the laser being input to the cavity; and
a measurement unit configured to measure an intensity of at least one of a reflected light and a transmitted light of the laser from the cavity.

2. The microscope according to claim 1,
wherein a resonance frequency of the cavity is variable.

3. The microscope according to claim 2,
wherein a surface of the material has a prevention film of reflection for the electromagnetic wave.

4. The microscope according to claim 1,
wherein the electromagnetic wave is a visible light, and
wherein the diameter is 1 μm within a precision that the diameter is similar to the wavelength.

5. The microscope according to claim 1,
wherein the scanning unit includes
a stage configured to fix the material, and
a Piezoelectric element configured to move the stage along the three-directions.

6. The microscope according to claim 1,
wherein the generation unit changes a frequency of the laser, and
wherein the measurement unit measures the intensity of one of the reflected light and the transmitted light at the relative position, the one corresponding to each of a plurality of lasers each differently having the frequency.

7. An observation method using a cavity, comprising:
decreasing a diameter of a mode waist of a cavity mode so that the diameter is similar to a wavelength of an electromagnetic wave resonant with the cavity mode when a material is located in the cavity, the material including a physical system having two quantum states;
scanning a relative position between the material and the mode waist along three-directions unparallel mutually;
generating a laser coupled with the cavity mode, the laser being input to the cavity; and
measuring an intensity of at least one of a reflected light and a transmitted light of the laser from the cavity.

* * * * *